(No Model.)
C. D. HASKINS & C. E. SCRIBNER.
ELECTRIC RESISTANCE INDICATING DEVICE.
No. 414,310. Patented Nov. 5, 1889.
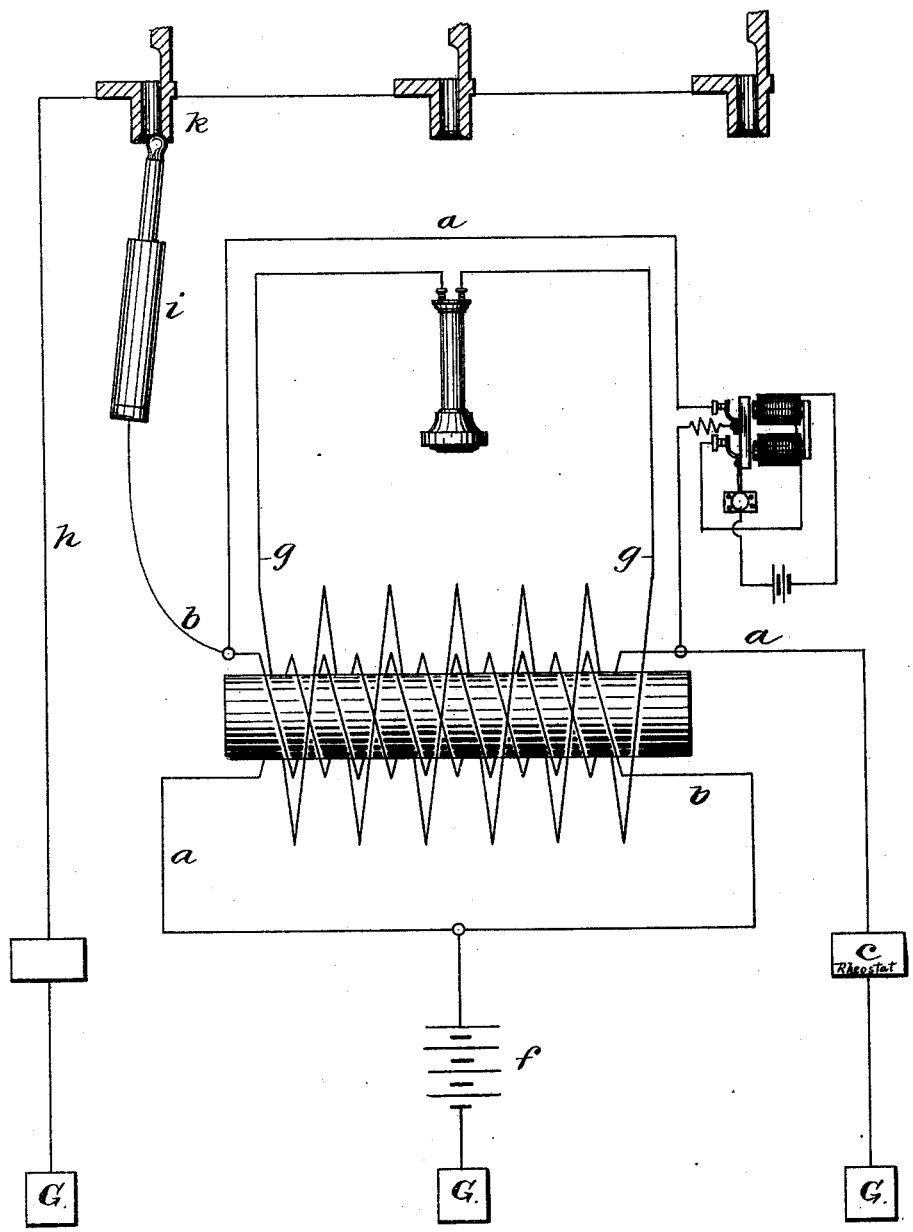
Witnesses:
Chas. G. Hawley.
T. J. Thompson.
Inventors:
Charles D. Haskins.
Charles E. Scribner
By George P. Barton
Attorney
N. PETERS, Photo-Lithographer, Washington, D. C.

United States Patent Office.

CHARLES DARWIN HASKINS, OF BROOKLYN, NEW YORK, AND CHARLES E. SCRIBNER, OF CHICAGO, ILLINOIS, ASSIGNORS TO THE WESTERN ELECTRIC COMPANY, OF CHICAGO, ILLINOIS.

ELECTRIC-RESISTANCE-INDICATING DEVICE.

SPECIFICATION forming part of Letters Patent No. 414,310, dated November 5, 1889.

Application filed May 24, 1888. Serial No. 274,883. (No model.)

*To all whom it may concern:*

Be it known that we, CHARLES DARWIN HASKINS, a citizen of the United States, residing at Brooklyn, in the county of Kings and State New York, and CHARLES E. SCRIBNER, a citizen of the United States, residing at Chicago, in the county of Cook and State of Illinois, have invented certain new and useful Improvements in Electric-Resistance-Indicating Apparatus, (Case 154,) of which the following is a full, clear, concise, and exact description, reference being had to the accompanying drawing, forming a part of this specification.

Our invention relates to apparatus for indicating electric resistance or for comparing the resistance in one circuit with resistance of a known amount, forming a portion of our apparatus.

Our invention is more especially designed for use in connection with the test-circuits of a multiple system of telephone-exchange. It may, however, be used for any purpose to which it may be adapted.

Our invention consists, essentially, in two equal differentially-wound primary coils of an induction-coil connected with a battery, in combination with a rheotome between said coils, a telephone or other current-indicating instrument in the secondary coil of the induction-coil, a rheostat in the grounded primary winding, and a switching device for closing the other primary winding to the circuit including the resistance which is to be measured or compared with the known resistance of the rheostat.

The invention is illustrated in the accompanying drawing, in which we have shown our apparatus in connection with a circuit the resistance of which is to be tested.

The induction-coil is provided with two equal primary differential windings $a$ and $b$. Winding $a$ passes through the rheostat $c$ to ground. Winding $b$ is shown connected with a flexible cord provided with a terminal connecting-plug. In the circuit of wire $d$, which is connected with the opposite ends of the different primary coils $a$ $b$, is placed a reed or rheotome $e$, which continuously opens and closes the circuit of wire $d$. The coils $a$ $b$ are connected in derived circuit with a common battery $f$. The strength of the current derived from the battery in the different coils will depend upon the resistance of the circuits, respectively, including said coils. If the resistance of the circuits be equal, the current in each of said primary coils will be equal; and hence their effect upon the core of the induction-coil will be neutral. The resistance of the rheostat $c$ may always be known, and may be fixed at a certain amount, or varied, as desired. The secondary winding $g$ of the induction-coil includes a telephone, which is one of the most sensitive current-indicating devices. Circuit $h$ may be considered as the circuit whose resistance is to be tested or compared with the resistance of the rheostat $c$. The tip of the plug $i$ is shown in contact with a test-piece $k$ of said circuit $h$. When the circuit of coil $b$ is thus closed with circuit $h$, no sound or tone will be heard in the telephone in case the resistance of said circuit $h$ shall be equal to the resistance of the rheostat $c$. If, however, the resistance of circuit $h$ shall be substantially less or more, the tone caused by the reed or rheotome $e$ will be heard in the telephone. Thus, when a tone is heard in the telephone at the time connection is closed between wire $b$ and the circuit to be tested, the one listening will know that the resistance of said circuit $h$ is greater or less than the resistance of the rheostat $c$.

The apparatus herein described admits of many modifications which would readily suggest themselves to those skilled in the art. We therefore do not limit ourselves to the construction shown.

Having thus described our invention, we claim as new and desire to secure by Letters Patent—

1. The combination, with the battery, of two equal differentially-wound primary coils of an induction-coil connected therewith in derived circuit, one of said coils being connected through the rheostat to ground, and the other coil being provided with a switching device, a wire including a vibrator or rheotome between the extremities of said coils, and a current-indicating device included in the secondary of said coil, substantially as and for the purpose specified.

2. The combination, with the battery, of the two primary coils of an induction-coil connected therewith, said coils being wound upon the core of the induction-coil in opposite directions or differentially, a circuit making and breaking device included in a wire between the outer ends of said primary coils, one of said coils being closed to ground through a known resistance and the other coil being connected with a circuit to be tested, and a telephone included in the secondary coil of the induction-coil, whereby it may be determined whether the resistance of the circuit to be tested is equal in amount to said known resistance.

3. The combination, with the differentially-wound primary coils, of a battery connected therewith, one of said primary coils being closed to ground through a variable rheostat, the other coil being connected with a circuit to be tested, and a telephone included in the secondary coil provided upon said induction-coil, substantially as and for the purpose specified.

CHARLES DARWIN HASKINS.
CHARLES E. SCRIBNER.

Witnesses for Mr. Haskins:
WM. H. CAPEL,
IRA R. STEWARD.

Witnesses for Mr. Scribner:
CHAS. G. HAWLEY,
C. C. WOODWORTH.